(12) United States Patent
Kwak et al.

(10) Patent No.: US 9,515,360 B2
(45) Date of Patent: Dec. 6, 2016

(54) BATTERY PACK AIR COOLING STRUCTURE PROVIDED WITH THERMOELECTRIC ELEMENT AND CONTROL METHOD THEREOF

(71) Applicant: Hyundai Motor Company, Seoul (KR)

(72) Inventors: Jin Woo Kwak, Gyeongsangbuk-do (KR); Kyung Hwa Song, Seoul (KR); Jeong Hun Seo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 450 days.

(21) Appl. No.: 14/097,831

(22) Filed: Dec. 5, 2013

(65) Prior Publication Data

US 2014/0371946 A1    Dec. 18, 2014

(30) Foreign Application Priority Data

Jun. 17, 2013   (KR) .................. 10-2013-0069307

(51) Int. Cl.
    *H01M 10/625*    (2014.01)
    *H01M 10/42*     (2006.01)
    (Continued)

(52) U.S. Cl.
    CPC ......... *H01M 10/5016* (2013.01); *G05D 23/19* (2013.01); *H01M 2/1077* (2013.01); *H01M 10/4207* (2013.01); *H01M 10/617* (2015.04); *H01M 10/625* (2015.04); *H01M 10/633* (2015.04); *H01M 10/647* (2015.04); *H01M 10/6552* (2015.04); *H01M 10/6553* (2015.04);
    (Continued)

(58) Field of Classification Search
    CPC . H01M 10/625; H01M 2/1077; H01M 10/633
    See application file for complete search history.

(56) References Cited

U.S. PATENT DOCUMENTS 8,841,015 B2 * 9/2014 Yoon ................. H01M 10/5016
                                                    429/120
2006/0216582 A1 * 9/2006 Lee ..................... H01M 2/1077
                                                    429/120
(Continued)

FOREIGN PATENT DOCUMENTS

JP    2009-147187 A    7/2009
JP    2009-212005 A    9/2009
(Continued)

*Primary Examiner* — Stewart Fraser
(74) *Attorney, Agent, or Firm* — Mintz Levin Cohn Ferris Glovsky and Popeo, P.C.; Peter F. Corless (57) ABSTRACT

A battery pack air cooling structure and method having a thermoelectric element are provided. The structure includes a housing having a cooling passageway through which a refrigerant passes and a plurality of cell module assemblies that are disposed inside the housing and each include a pair of unit cells stacked parallel to each other. A heat transfer plate is interposed between the pair of unit cells. A heat pipe has a first portion disposed in the heat transfer plate and protrudes second portion that protrudes out of the heat transfer plate. A heat-exchanging member formed at the second portion of the heat pipe and is configured to perform heat-exchange with air that passes through the cooling passageway; and a thermoelectric element is formed at an upstream side into which air of the cooling passageway is injected.

13 Claims, 4 Drawing Sheets (51) Int. Cl.
*G05D 23/19* (2006.01)
*H01M 2/10* (2006.01)
*H01M 10/6553* (2014.01)
*H01M 10/633* (2014.01)
*H01M 10/6563* (2014.01)
*H01M 10/647* (2014.01)
*H01M 10/6556* (2014.01)
*H01M 10/6552* (2014.01)
*H01M 10/6572* (2014.01)
*H01M 10/617* (2014.01)
*H01M 10/6569* (2014.01)

(52) U.S. Cl.
CPC ..... *H01M 10/6556* (2015.04); *H01M 10/6563* (2015.04); *H01M 10/6572* (2015.04); *H01M 10/6569* (2015.04); *H01M 2220/20* (2013.01)

(56) References Cited

U.S. PATENT DOCUMENTS

| 2011/0287285 | A1* | 11/2011 | Yoon | H01M 10/5016 |
| | | | | 429/9 |
| 2011/0300420 | A1* | 12/2011 | Johnson, Jr. | H01M 10/633 |
| | | | | 429/62 |
| 2012/0282510 | A1 | 11/2012 | Youngs et al. | |
| 2013/0216888 | A1* | 8/2013 | Shimura | H01M 10/5002 |
| | | | | 429/120 |

FOREIGN PATENT DOCUMENTS

| JP | 2009252652 A | 10/2009 |
| KR | 10-2006-0027578 A | 3/2006 |
| KR | 10-2007-0041064 A | 4/2007 |
| KR | 10-2010-0109872 | 10/2010 |
| KR | 10-2012-0004321 | 1/2012 |
| WO | 2011146919 A2 | 11/2011 |

* cited by examiner

BATTERY PACK AIR COOLING STRUCTURE PROVIDED WITH THERMOELECTRIC ELEMENT AND CONTROL METHOD THEREOF

CROSS-REFERENCE TO RELATED PATENT APPLICATION

This application claims the benefit of Korean Patent Application No. 10-2013-0069307, filed on Jun. 17, 2013 in the Korean Intellectual Property Office, the disclosure of which is incorporated herein in its entirety by reference.

BACKGROUND

1. Field of the Invention

The present invention relates to a battery pack air cooling structure provided with a thermoelectric element, and more particularly, to a battery pack air cooling structure provided with a thermoelectric element installed at an inlet of a cooling passageway controlling the temperature of each cell module assembly.

2. Description of the Related Art

Environmentally-friendly vehicles such as electric vehicles or fuel cell vehicles in which no exhaust gas is discharged and batteries are mounted on the environmentally-friendly vehicles to drive motors of the vehicles.

In electric vehicles the reliability and stability of a battery system are important factors for determining marketability of electric vehicles and an appropriate temperature range of the battery system must be maintained at about 35° C. to 40° C. to prevent the performance of a battery from deteriorating due to a change of various external temperatures. Therefore, a thermal control system for a pouch cell module that has excellent heat dissipation performance in a general climate condition (e.g., an appropriate temperature range for a battery system) and is capable of maintaining an appropriate temperature of the battery in a low temperature environment is required.

Generally, a battery pack assembly (BPA) is heated when a vehicle is driven or charged. An air cooling method is usually used as a method of cooling the BPA including a plurality of cell module assemblies. In particular, in a hybrid vehicle, cooling is performed by air supplied from a cabin of the vehicle and air supplied from a heating, ventilation, air conditioning (HVAC) system. In particular, a structure in which the BPA is cooled by one blower at one temperature has been generally used and the technology for minimizing a temperature difference according to a cell module assembly (CMA) has not been used due to the difficulty in forming a flow passageway. In addition, air conditioning may be performed to cool the BPA; however, then, an additional cooling device is required, or a vehicle air conditioner must operate at a reduced efficiency.

Furthermore, when the BPA is charged or discharged, a voltage difference occurs based on a temperature difference. The temperature difference operates as a variable in lowering the performance of the BPA. In other words, when one cell module assembly in which a substantial temperature difference occurs, may be damaged by deterioration and a damaged battery operates as a resistor and generates a high temperature. Deterioration may also occur in adjacent cell module assemblies, which may cause damage to the entire battery. When a substantial voltage difference occurs in each cell module assembly, an undesired result may occur in each driving motor unit of an electric vehicle in which a uniform voltage is an optimum usage condition.

SUMMARY

The present invention provides a battery pack air cooling structure in which temperature is controlled to minimize a temperature difference between a plurality of unit cells to prevent thermal distribution in the entire battery pack from being concentrated in a particular unit cell.

The present invention also provides a battery pack air cooling structure having a thermoelectric element that controls the temperature of each cell module assembly.

According to an aspect of the present invention, a battery pack air cooling structure having a thermoelectric element may include: a housing that has a cooling passageway through which a refrigerant passes; a plurality of cell module assemblies disposed within the housing and each may include a pair of unit cells stacked parallel to each other; a heat transfer plate interposed between the pair of unit cells to surface contact; a heat pipe, a first portion of which may be disposed in the heat transfer plate and a second portion of which may protrude from the heat transfer plate; a heat-exchanging member formed at a protruding end of the heat pipe and configured to perform heat-exchanging with air that passes through the cooling passageway; and a thermoelectric element formed at an upstream side into which air of the cooling passageway is injected.

The cooling passageway of the housing may be in a form of a rectangular duct, and an aperture may be formed in one side of the housing to allow the heat-exchanging member to penetrate and may be fixed to the aperture. The heat pipe may be a plurality of heat pipes (e.g., four heat pipes). In addition, the heat pipe may be formed of an aluminum material, and acetone may be filled in the heat pipe. The unit cells may be a plurality of unit cells (e.g., eight unit cells).

Furthermore, the battery pack air cooling structure may further include: a plurality of cooling passageways through which air passes to cool each of the plurality of cell module assemblies; a plurality of thermoelectric elements disposed in upstream sides of the plurality of cooling passageways of the plurality of cell module assemblies; and a controller configured to operate each of the plurality of thermoelectric elements, wherein the controller may be configured to perform cooling control or heating of the thermoelectric elements based on a temperature of each of the plurality of cell module assemblies.

When a temperature of one of the plurality of cell module assemblies is greater than temperatures of the other cell module assemblies, the controller may be configured to cool the thermoelectric elements, and when the temperature of one of the plurality of cell module assemblies is less than temperatures of the other cell module assemblies, the controller may be configured to heat the thermoelectric elements to minimize a temperature difference between the plurality of cell module assemblies. In addition, the controller may be configured to operate the thermoelectric elements to maintain the temperatures of the plurality of cell module assemblies to be within a range of about 25° C. to 30° C. The controller may be a battery management system (BMS).

According to another aspect of the present invention, a method of controlling a battery pack air cooling structure may include: measuring temperatures of at least one cell module assembly; determining which cell module assembly of the plurality of cell module assemblies requiring a temperature control; comparing the temperature of the determined cell module assembly with temperatures of the other cell module assemblies; and sequentially comparing the temperature of the determined cell module assembly with the temperatures of other cell module assemblies, wherein, when the temperature of the determined cell module assembly is greater than the temperatures of the other cell module assemblies, cooling a plurality of thermoelectric elements disposed at a cooling passageway of the determined cell module assembly, and when the temperature of the determined cell module assembly is less than the temperatures of the other cell module assemblies, heating the plurality of thermoelectric elements.

In sequentially comparing of the temperature of the determined cell module assembly with the temperatures of the other cell module assemblies, when the temperature of the determined cell module assembly is greater than the temperatures of the other cell module assemblies, the controller may be configured to cool a plurality of thermoelectric elements disposed at a cooling passageway of the determined cell module assembly. In addition, when the temperature of the determined cell module assembly is less than the temperatures of the other cell module assemblies, of the controller may be configured to heat the plurality of thermoelectric elements and the temperature of the determined cell module assembly may be maintained within a range of about 25° C. to 30° C.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will now be described more fully with reference to the accompanying drawings, in which exemplary embodiments of the invention are shown. Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

Figure 1:
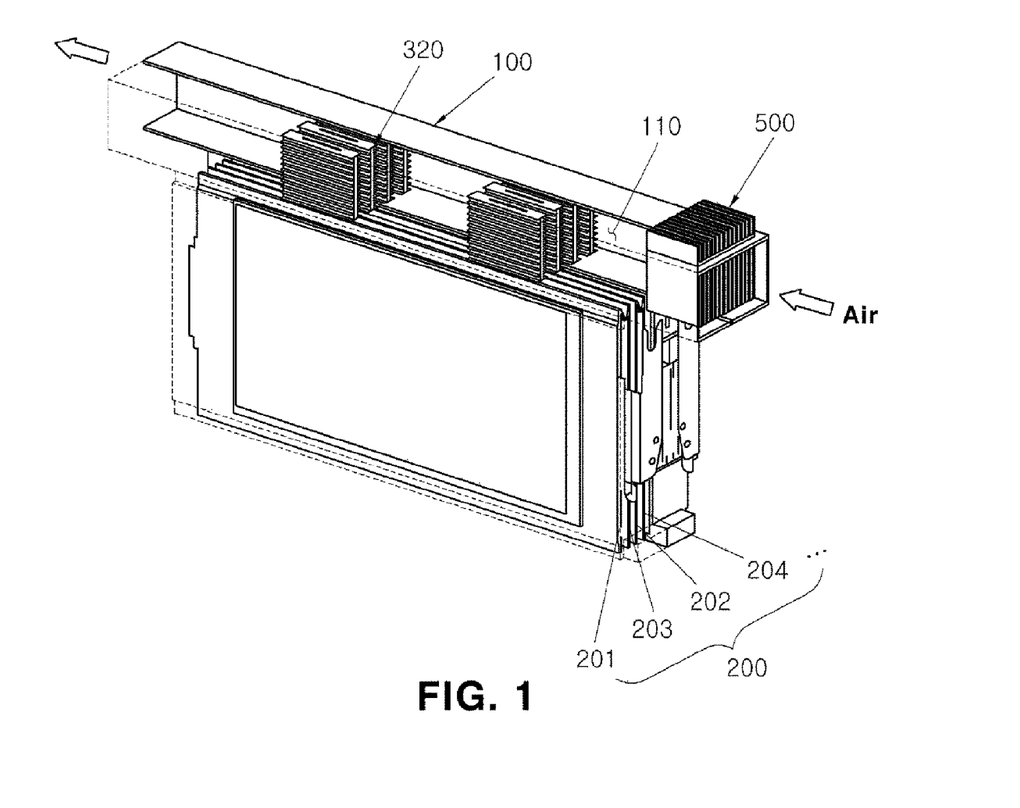
FIG. 1 is an exemplary view illustrating a battery pack air cooling structure having a thermoelectric element according to an exemplary embodiment of the present invention.
Figure 2:
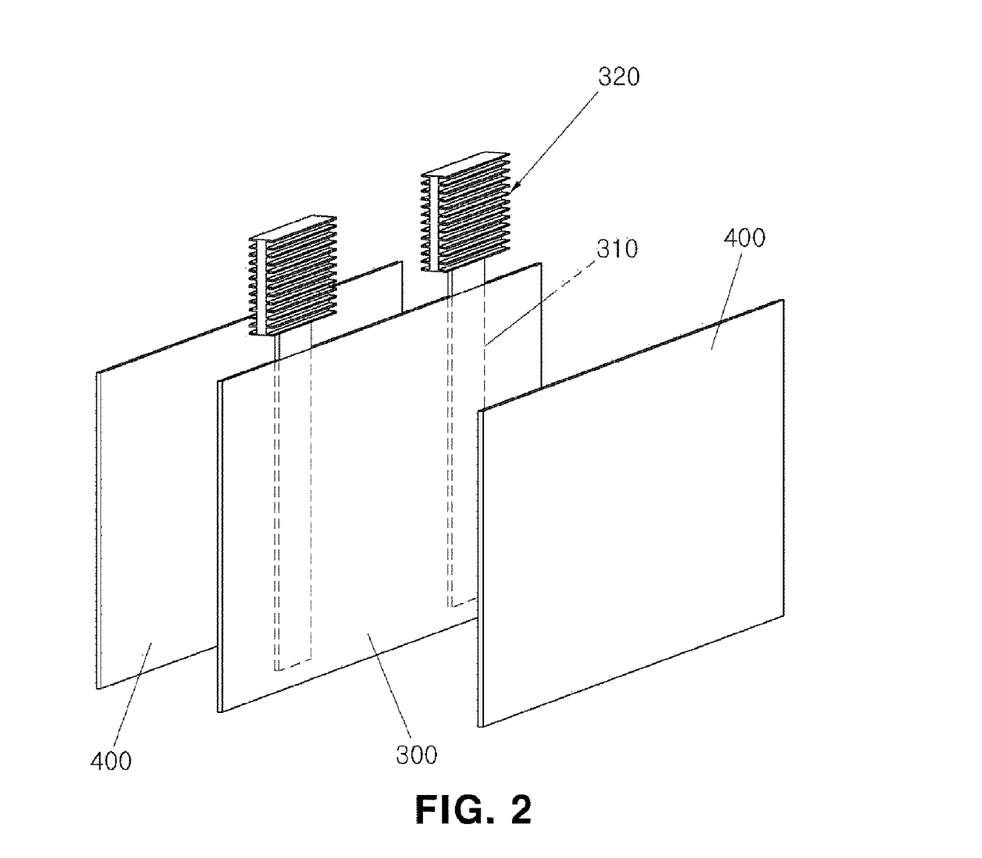
FIG. 2 is an exemplary view illustrating a heat pipe applied to the battery pack air cooling structure having the thermoelectric element illustrated in FIG. 1 installed at a heat transfer plate according to an exemplary embodiment of the present invention.
Figure 3:
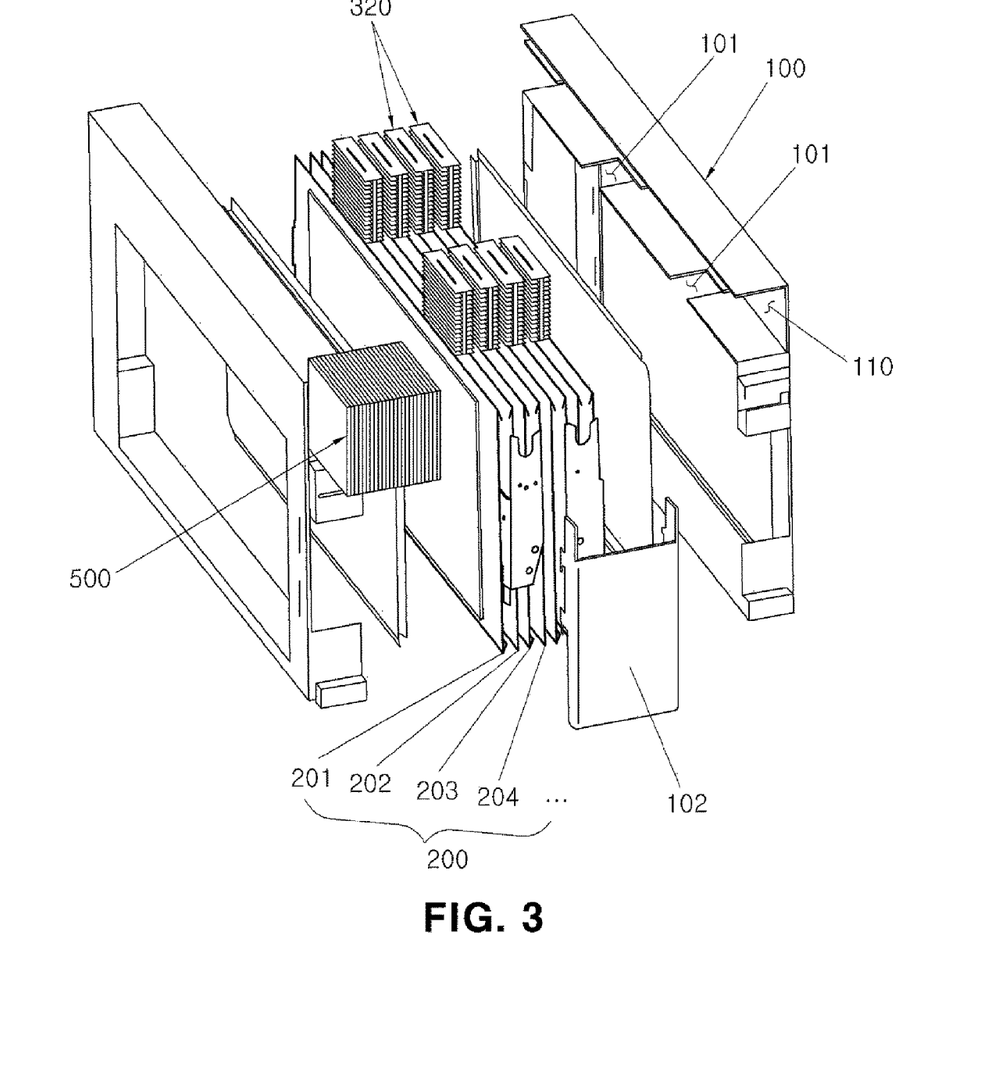
FIG. 3 is an exemplary detailed view of the battery pack air cooling structure having a thermoelectric element of FIG. 1 according to an exemplary embodiment of the present invention.
Figure 4:
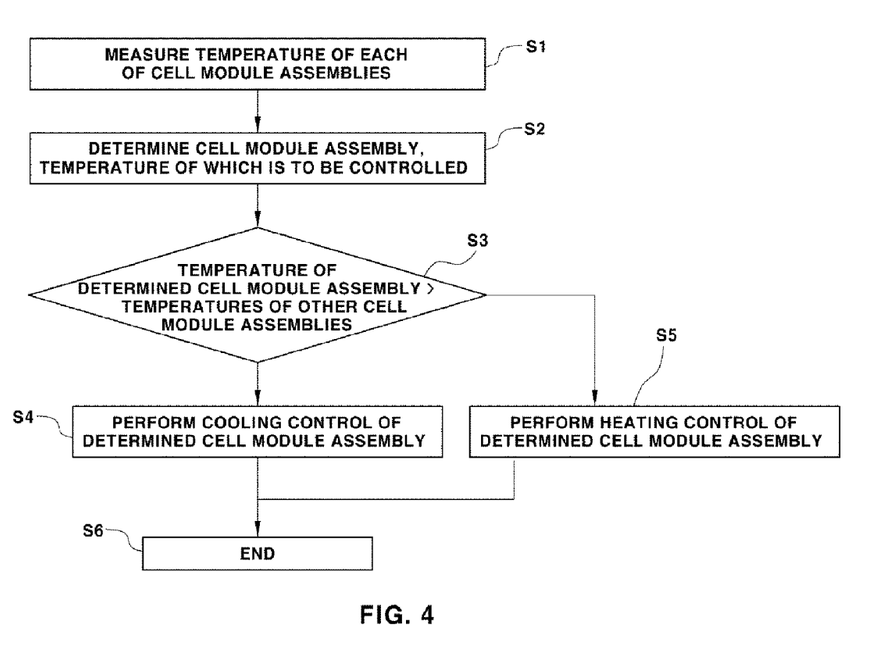
FIG. 4 is an exemplary flowchart illustrating a method of controlling the battery pack air cooling structure having the thermoelectric element of FIG. 1, according to an exemplary embodiment of the present invention.

FIG. 1 is an exemplary view illustrating a battery pack air cooling structure having a thermoelectric element according to an exemplary embodiment of the present invention, FIG. 2 is an exemplary view illustrating a heat pipe applied to the battery pack air cooling structure having the thermoelectric element illustrated in FIG. 1 installed at a heat transfer plate, FIG. 3 is an exemplary detailed view of the battery pack air cooling structure having a thermoelectric element of FIG. 1, and FIG. 4 is an exemplary flowchart illustrating a method of controlling the battery pack air cooling structure having the thermoelectric element of FIG. 1, according to an exemplary embodiment of the present invention.

As illustrated in FIGS. 1 through 3, the battery pack air cooling structure having a thermoelectric element according to an exemplary embodiment of the present invention may include a housing 100, a cell module assembly 200, a heat transfer plate 300, a heat pipe 310, a heat-exchanging member 320, and a plurality of thermoelectric elements 500.

The housing 100 may have an inner space and may be configured to protect the cell module assembly 200 from an external shock. In addition, a cooling passageway 110 through which a refrigerant may pass may be formed inside the housing 100. The cooling passageway 110 may have a rectangular cross-section in the form of a rectangular duct. Air that flows through the cooling passageway 110 may contact the heat-exchanging member 320 formed at an end of the heat pipe 310 that will be described below allowing heat exchanging to be performed. In particular, the heat pipe 310 may penetrate one side of the cooling passageway 110, and an aperture 101 may be formed allowing the heat-exchanging member 320 to be positioned inside the cooling passageway 110. Further, a plurality of cooling pins (not shown) that extend in a flow direction of water may be stacked parallel to each other to obtain a contact area with air that flows in the cooling passageway 110.

The housing 100 may include two components to surround substantially the entire surface of the cell module assembly 200 at both sides of the housing 100. In addition, a side cover 102 of the housing 100 may be detached from and combined with the housing 100 for assembling purposes. In addition, a plurality of unit cells 201, 202, 203, and . . . may be stacked parallel to each other inside the housing 100. Each one pair of the unit cells 201, 202, 203, and . . . may be adjacent to each other and electrode taps (not shown) may be connected to each other. In the exemplary embodiment of the present embodiment, each one pair of eight unit cells 201, 202, 203, and . . . of the cell module assembly 200 may be connected to each other.

The heat transfer plate 300 may be interposed between a pair of unit cells 201 and 202 of the cell module assembly 200. In other words, the heat transfer plate 300 may be interposed between the pair of unit cells 201 and 202 to surface contact to transfer the heat generated in the unit cells 201 and 202 to the heat transfer plate 300.

As illustrated in FIG. 2, a first portion of the heat pipe 310 may be disposed in the heat transfer plate 300, and protrudes second portion of the heat pipe 310 may protrude in one direction. In other words, heat inside the heat transfer plate 300 may be transferred to the heat pipe 310 and then may be transferred to the heat-exchanging member 320 formed at a protruding end of the heat pipe 310.

Furthermore, silicon pads 400 may be disposed at both surfaces of the heat transfer plate 300. The silicon pads 400 may operate as interfacial plates that closely contact a unit cell and indirectly cool all surfaces of the unit cell. A plurality of heat pipes 310 (e.g., four heat pipes) may have one heat pipe 310 disposed in one place of the heat transfer plate 300. In other words, the plurality of heat pipes 310 may be disposed in various locations in the heat transfer plate 300. The heat pipes 310 may be formed of an aluminum material to improve heat transfer efficiency, and acetone may be filled in the heat pipe 310.

A controller (not shown) to which the temperature of each cell module assembly 200 is input may be configured to cool or heat the thermoelectric elements 500. When the temperature of one of the cell module assemblies 200 is greater than temperatures of the other cell module assemblies 200 (e.g., the remaining cell module assemblies 200), the controller may be configured to cool the thermoelectric elements 500 by varying polarities of the thermoelectric elements 500. When the temperature of one of the cell module assemblies 200 is less than temperatures of the other cell module assemblies 200, the controller may be configured to heat the thermoelectric elements 500 to decrease (e.g., minimize) a temperature difference between a plurality of cell module assemblies 200. In particular, the thermoelectric elements 500 installed at each cell module assembly 200 may be controlled to maintain the temperature of each cell module assembly 200 within the range of about 25° C. to 30° C. Although the controller may be additionally configured, the control operation may be performed using a battery management system (BMS).

FIG. 4 is an exemplary flowchart illustrating a method of controlling the battery pack air cooling structure having the thermoelectric element illustrated in FIG. 1, according to an exemplary embodiment of the present invention.

According to the method illustrated in FIG. 4, the controller may be configured to measure the temperature of each of a plurality of cell module assemblies 200 (S1). After the temperature of each of the plurality of cell module assemblies 200 has been measured, a cell module assembly, a temperature of which is to be controlled may be determined (S2). In determining the cell module assembly 200, a temperature of which is to be controlled, may be performed by operating one of the plurality of cell module assemblies 200, the measured temperature of which is greater than or lower than the other cell module assemblies, or by sequentially operating the plurality of cell module assemblies 200.

Next, the temperature of the determined cell module assembly 200 may be compared with temperatures of the other cell module assemblies 200 (S3). Comparing of the temperature of the determined cell module assembly 200 with the temperatures of the other cell module assemblies 200 may include comparing temperatures between adjacent cell module assemblies 200 or by sequentially comparing temperatures between other cell module assemblies 200 except for the determined cell module assembly 200.

After the temperatures between the cell module assemblies 200 have been compared when the temperature of the determined cell module assembly 200 is greater than the temperatures of other cell module assemblies 200, the controller may be configured to lower the temperature of the determined cell module assembly 200 by operating the thermoelectric elements 500 of the cooling passageway 110 of the determined cell module assembly 200 (S4). When the temperature of the determined cell module assembly 200 is less than the temperatures of the other cell module assemblies 200, the controller may be configured to heat the temperature of the determined cell module assembly 200 by operating the thermoelectric elements 500 (S5). Through this operating, when the temperature of the determined cell module assembly 200 is at an appropriate level (e.g., within a predetermined range), the control operation may be terminated (S6).

As described above, when a battery pack air cooling structure having a thermoelectric element according to an exemplary embodiment of the present invention is used, the temperature of each cell module assembly may be individually controlled to prevent the substantially entire battery pack from being damaged due to a high temperature concentrated in a particular cell module assembly and another deterioration induced in adjacent cell module assemblies.

In addition, since the temperature of air that flows through the cooling passageway 110 may be cooled more quickly using the thermoelectric elements 500, temperatures of a plurality of unit cells that closely contact each other via the heat-exchanging member 320, the heat pipe 310, and the heat transfer plate 300 may be controlled more quickly. Thus, temperature control may be performed to reduce a temperature difference between the plurality of unit cells. As a result, temperature control may be performed to prevent thermal distribution in substantially the entire battery pack from being concentrated in a particular unit cell.

Generally, an operation of a heat pipe is performed as a temperature difference between a bottom heating unit and a top condensation unit increases. In the battery pack air cooling structure using a thermoelectric element according to an exemplary embodiment of the present invention, an evaporation velocity and a condensation velocity of a heat transfer medium inside the heat pipe may increase to improve heat transfer efficiency. Thus, an average temperature of air in a general battery module may be maintained between about 25° C. and 40° C. In the battery pack air cooling structure using a thermoelectric element according to an exemplary embodiment of the present invention, a condensation unit may be cooled using low-temperature air cooling of about 5° C. to 15° C. that is established using the thermoelectric element to improve cooling efficiency improved compared to an existing battery module.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A battery pack air cooling structure having a thermoelectric element, the battery pack air cooling structure comprising:
    a housing having a cooling passageway through which a refrigerant passes;
    a plurality of cell module assemblies disposed inside the housing and each including a pair of unit cells stacked parallel to each other;
    a heat transfer plate interposed between the pair of unit cells;
    a heat pipe having a first portion disposed in the heat transfer plate and a second portion that protrudes out of the heat transfer plate;
    a heat-exchanging member formed at the second portion of the heat pipe and configured to perform heat-exchange with air that passes through the cooling passageway; and
    a thermoelectric element formed at an upstream side of the cooling passageway into which air of the cooling passageway is injected.

2. The battery pack air cooling structure of claim 1, wherein the cooling passageway of the housing is in a form of a rectangular duct, and an aperture is formed in one side of the housing causing the heat-exchanging member to penetrate and to be fixed to the aperture.

3. The battery pack air cooling structure of claim 1, wherein the heat pipe includes four heat pipes.

4. The battery pack air cooling structure of claim 1, wherein the heat pipe is formed of an aluminum material and acetone is filled in the heat pipe.

5. The battery pack air cooling structure of claim 1, wherein the unit cells include eight unit cells.

6. The battery pack air cooling structure of claim 1, further comprising:
    a plurality of cooling passageways through which air passes to cool each of the plurality of cell module assemblies;
    a plurality of thermoelectric elements disposed in upstream sides of the plurality of cooling passageways of the plurality of cell module assemblies; and
    a controller configured to operate each of the plurality of thermoelectric elements,
    wherein the controller is configured to cool or heat the thermoelectric elements based on a temperature of each of the plurality of cell module assemblies.

7. The battery pack air cooling structure of claim 6, wherein, when a temperature of one of the plurality of cell module assemblies is greater than temperatures of the remaining cell module assemblies, the controller is configured to cool the thermoelectric elements, and when the temperature of one of the plurality of cell module assemblies is less than temperatures of the remaining cell module assemblies, the controller configured to heat the thermoelectric elements to reduce a temperature difference between the plurality of cell module assemblies.

8. The battery pack air cooling structure of claim 7, wherein the controller is configured to operate the thermoelectric elements to maintain temperatures of the plurality of cell module assemblies within a range of about 25° C. to 30° C.

9. The battery pack air cooling structure of claim 6, wherein the controller is a battery management system (BMS).

10. A method of controlling a battery pack air cooling structure, the method comprising:
    measuring, by a controller, a temperature of a plurality of cell module assemblies;
    determining, by the controller, a cell module assembly, a temperature of which is to be controlled, from the plurality of cell module assemblies;
    comparing, by the controller, the temperature of the determined cell module assembly with temperatures of the remaining cell module assemblies;
    sequentially comparing, by the controller, the temperature of the determined cell module assembly with the temperatures of the remaining cell module assemblies;
    cooling, by the controller, a plurality of thermoelectric elements disposed at a cooling passageway of the determined cell module assembly when the temperature of the determined cell module assembly is greater than the temperatures of the remaining cell module assemblies; and
    heating, by the controller, the plurality of thermoelectric elements when the temperature of the determined cell module assembly is lower than the temperatures of other cell module assemblies.

11. The method of claim 10, wherein, the sequentially comparing of the temperature of the determined cell module assembly with the temperatures of the remaining cell module assemblies includes:
    cooling, by the controller, the plurality of thermoelectric elements provided at the cooling passageway of the determined cell module assembly when the temperature of the determined cell module assembly is greater than the temperatures of the remaining cell module assemblies;
    heating, by the controller, the plurality of thermoelectric elements when the temperature of the determined cell module assembly is less than the temperatures of the remaining cell module assemblies; and
    maintaining, by the controller, the temperature of the determined cell module assembly within a range of about 25° C. to 30° C.

12. A non-transitory computer readable medium containing program instructions executed by a controller, the computer readable medium comprising:
    program instructions that measure a temperature of a plurality of cell module assemblies;

program instructions that determine a cell module assembly, a temperature of which is to be controlled, from the plurality of cell module assemblies;

program instructions that compare the temperature of the determined cell module assembly with temperatures of the remaining cell module assemblies;

program instructions that sequentially compare the temperature of the determined cell module assembly with the temperatures of the remaining cell module assemblies;

program instructions that cool a plurality of thermoelectric elements disposed at a cooling passageway of the determined cell module assembly when the temperature of the determined cell module assembly is greater than the temperatures of the remaining cell module assemblies; and program instructions that heat the plurality of thermoelectric elements when the temperature of the determined cell module assembly is lower than the temperatures of other cell module assemblies.

13. The non-transitory computer readable medium of claim 12, further comprising:

program instructions that cool the plurality of thermoelectric elements provided at the cooling passageway of the determined cell module assembly when the temperature of the determined cell module assembly is greater than the temperatures of the remaining cell module assemblies;

program instructions that heat the plurality of thermoelectric elements when the temperature of the determined cell module assembly is less than the temperatures of the remaining cell module assemblies; and program instructions that maintain the temperature of the determined cell module assembly within a range of about 25° C. to 30° C.

* * * * *